Mar. 6, 1923.
W. J. BERNETT.
FUEL MIXER FOR EXPLOSION MOTORS.
FILED APR. 22, 1920.
1,447,640.
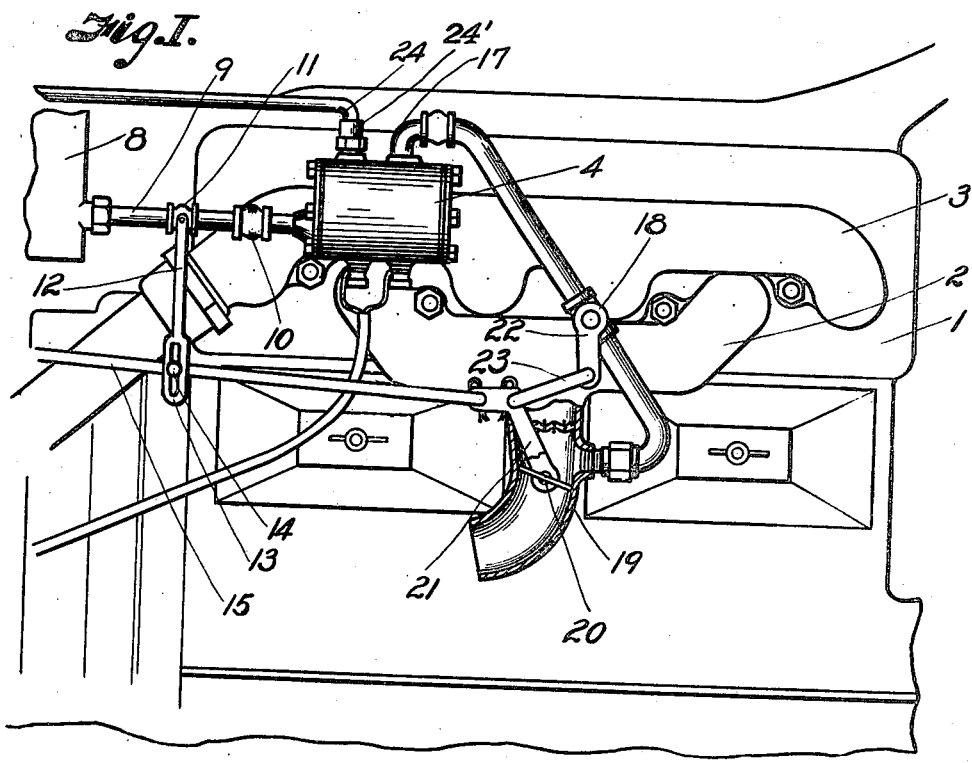
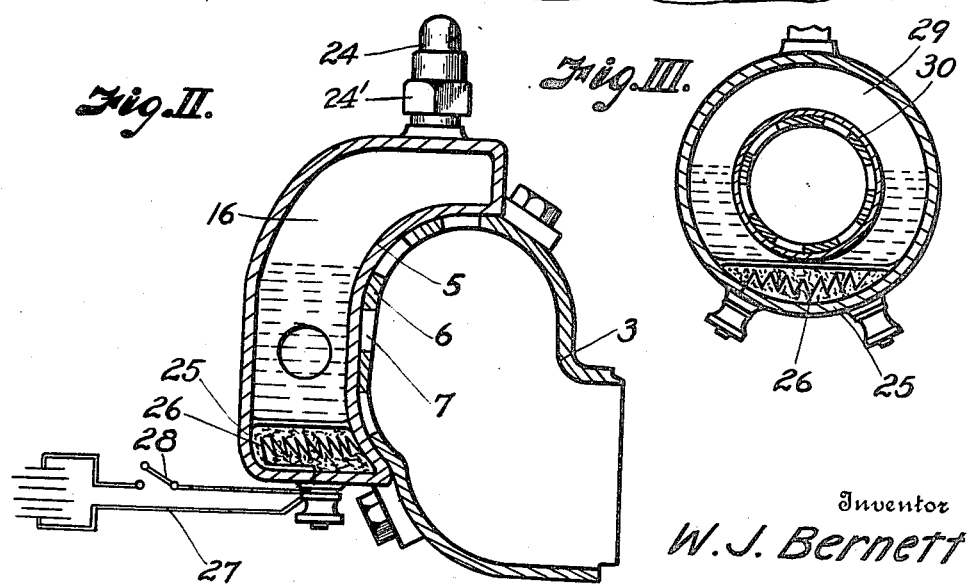
Inventor
W. J. Bernett
By Arthur C. Brown
Attorney Patented Mar. 6, 1923.

1,447,640

UNITED STATES PATENT OFFICE.

WILLIS J. BERNETT, OF KANSAS CITY, MISSOURI.

FUEL MIXER FOR EXPLOSION MOTORS.

Application filed April 22, 1920. Serial No. 375,794.

*To all whom it may concern:*

Be it known that I, WILLIS J. BERNETT, a citizen of the United States, residing at Kansas City, in the county of Jackson and State of Missouri, have invented certain new and useful Improvements in Fuel Mixers for Explosion Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an air and gas or vapor mixer whereby liquid fuel is adapted to be vaporized or gasified and then mixed with air, preparatory to being introduced into the combustion cylinder of an explosion motor as the fuel charge.

According to my invention the fuel oil may be first gasified or vaporized and then mixed with a requisite amount of air to render it efficient as a fuel charge, the proportions of vapor and air being determined by certain measuring devices or valves employed outside of the combustion chamber of the engine. The construction of the device is such that true carburation does not take place but rather a mixing of the component parts of the fuel charge. The liquid constituent of the fuel charge is heated to a temperature high enough to vaporize or gasify it and as it mixes with the air, it will enter the combustion chamber in a heated condition so that ignition may be promoted by the compression within the cylinder and the spark of the spark plug.

I have also provided means to be associated with the generating device whereby the liquid constituent may be primed or preheated in starting the engine.

Other novel features of the invention will be apparent by reference to the following description in connection with the accompanying drawings, in which Fig. I is a fragmentary, diagrammatic view of an engine to which my invention is applied, the intake manifold being shown partly in section.

Fig. II is a cross sectional view through part of the exhaust manifold and vaporizer chamber, and Fig. III is a slightly modified form of vaporizer chamber and the exhaust pipe.

1 designates an engine of appropriate construction provided with an intake manifold 2 and an exhaust manifold 3. Secured to the manifold 3 is a vaporizer tank or chamber 4, having a curved inner wall 5 to fit closely about the wall 6 of the manifold 3. The wall 6 of the manifold 3 is provided with a plurality of openings 7 whereby the exhaust gases may contact with the curved wall 5 so as to heat the contents of the vaporizing tank or chamber 4. The vaporizing tank or chamber 4 is supplied from a supply tank 8 of appropriate construction through the medium of a pipe 9, which communicates with one end of the tank or chamber 4. Within the pipe 9 is a check valve 10, opening in the direction of the tank 4 and the pipe 9 is also provided with a mechanically actuated valve 11, having a valve lever 12, at one end of which is a slot 13 engaged by a pin or lug 14 on the pull rod 15, which operates certain valves for determining the proportions of air and vapor or gas to constitute the mixture.

Leading from the upper portion of the chamber or tank 4, that is, from the gas or vapor space 16, is an exhaust pipe 17, having a valve 18 and discharging into the inlet pipe 19 of the intake manifold 2. The discharge end of pipe 17 is above an air valve, shown as a butterfly valve 20, which may be actuated by an elbow lever 21 connected to the crank arm 22 of the valve 18 by a link 23, the elbow lever 21 being connected to the pull rod 15. Therefore, when the pull rod is operated in either direction, the valves 18 and 20 are synchronously operated to vary the proportions of vapor or gas and air which enters the inlet manifold 2.

If the pressure in the space 16 exceeds a determined amount, it may escape through an escape pipe 24, in which a suitable pressure valve 24' may be located if desired.

When the parts are assembled, the liquid will flow from chamber 8 to chamber or tank 4 through pipe 9, the flow being determined by the valve 11. The heat from the manifold 3 will vaporize or gasify the liquid and it may be stored in the space 16 and discharged through pipe 17 at a rate determined by the valve 18, and since the valve 18 is connected to the valve 20, it will be obvious that the ratio of air and gas or vapor may be determined by operating the pull rod 15. The operation of the pull rod will also operate the valve 11 so that when the valves 18 and 20 are wide open, the valve 11 will be opened wider than when valves 18 and 20 are partially closed. Therefore, the pull rod is effective not only to control the valves 18 and 20 but also to control the flow of the liquid from 8 to 4 in proportion to the amount discharged through pipe 17, there being a definite ratio between the port closed by the valve 18, the port closed by valve 20 and the port closed by valve 11, as will be well understood.

It is obvious that the gasified or vaporized liquid will not flow into the manifold 2 except under pressure, the pressure being generated by the gasification of the liquid. Therefore, when the engine is cold, there can be no flow from 16 to the intake manifold.

I have provided means for preliminarily heating or priming the liquid in the tank or chamber 4 and this consists of a subjacent heater chamber 25, which may be part of the casting or tank 4 and said chamber 25 is shown as containing a heating element 26 energized through the circuit 27, in which a circuit closer 28 is provided. Therefore, when the engine is to be started, the heating element will be energized and the heat supplied for vaporizing the fuel.

In Fig. III I have shown a slightly modified form of vaporizing chamber which consists of a cylindrical, hollow member 29, sleeved upon the exhaust pipe 30. In other respects the vaporizing chamber or tank is substantially the same as that designated 4.

What I claim and desire to secure by Letters-Patent is:

1. A vaporizing chamber for explosion motors having a valved intake manifold, comprising a casing, an inlet pipe for said casing, a discharge pipe for said casing, a valve in each pipe, means for simultaneously operating said valves, and additional means carried by the first named means for operating the valve in the intake manifold.

2. A vaporizing chamber for explosion motors having a valved intake manifold, comprising a casing, an inlet pipe at one end of the casing, a discharge pipe at the top of the casing, a valve in each pipe, means for simultaneously operating both valves, and means connected to the first named means for operating the valve in the intake manifold.

3. A vaporizing chamber for explosion motors having a valved intake manifold, comprising a casing, an inlet pipe for said casing, a discharge pipe for said casing, a valve in each pipe, means for simultaneously operating the valve in the inlet pipe, the valve in the discharge pipe and the valve in the intake manifold, and an exhaust pipe leading from the top of the casing and having an outwardly opening valve therein.

In testimony whereof I affix my signature.

WILLIS J. BERNETT.